US006497269B2

(12) United States Patent
Sonnenberg et al.

(10) Patent No.: US 6,497,269 B2
(45) Date of Patent: Dec. 24, 2002

(54) PROCESSES FOR FORMING STYRENIC COPOLYMERS

(75) Inventors: Fred Sonnenberg, Fort Worth, TX (US); Richard Anton Schwarz, Colleyville, TX (US)

(73) Assignee: StyroChem Delaware, Inc., Wilmington, DE (US)

( * ) Notice: Subject to any disclaimer, the term of this patent is extended or adjusted under 35 U.S.C. 154(b) by 0 days.

(21) Appl. No.: 10/054,258

(22) Filed: Jan. 22, 2002

(65) Prior Publication Data

US 2002/0088597 A1 Jul. 11, 2002

Related U.S. Application Data

(63) Continuation of application No. 09/828,408, filed on Apr. 6, 2001, now Pat. No. 6,360,807, which is a continuation-in-part of application No. 09/473,606, filed on Dec. 29, 1999, now abandoned.

(51) Int. Cl.$^7$ .............. B22C 9/02; C08J 9/18; C08J 9/20
(52) U.S. Cl. .......... 164/34; 164/246; 521/56; 521/59; 521/60; 526/201
(58) Field of Search .............. 521/56, 59, 60; 164/34, 246; 526/201

(56) References Cited

U.S. PATENT DOCUMENTS

| 2,673,194 A | 3/1954 | Grien |
| 3,932,986 A | 1/1976 | Kosaka et al. |
| 4,085,169 A | 4/1978 | Saito et al. |
| 4,091,054 A | 5/1978 | Saito et al. |
| 4,169,193 A | 9/1979 | Biglione et al. |
| 4,169,828 A | 10/1979 | Wright |
| 4,183,993 A | 1/1980 | Benstead et al. |
| 4,333,969 A | 6/1982 | Wright et al. |
| 4,581,275 A | 4/1986 | Endo et al. |
| 5,147,937 A | 9/1992 | Frazza et al. |
| 5,935,645 A | 8/1999 | Anfuso et al. |
| 6,360,807 B2 * | 3/2002 | Sonnenberg et al. |

OTHER PUBLICATIONS

Kurt C. Frisch and James H. Saunders, *Plastic Foams in Two Parts*, Part II, Subject Index pages 1019 and 1018 and p. 538, 1979 Mercel Dekker, Inc., New York, NY.

* cited by examiner

Primary Examiner—Morton Foelak
(74) Attorney, Agent, or Firm—Duane Morris LLP

(57) ABSTRACT

Copolymers are formed by suspension polymerization of monomers, including one or more styrenic monomers, and one or more acrylic monomers. The monomers can be polymerized in the presence of polymeric seeds. The polymerization can be carried out in the presence of one or more blowing agents, producing polymers that can be expanded. The methods are useful, for example, in forming expandable polymeric particles. The expandable polymer particles are useful in processes such as forming patterns for lost foam molding techniques.

12 Claims, No Drawings

PROCESSES FOR FORMING STYRENIC COPOLYMERS

REFERENCE TO RELATED APPLICATION

This application is a continuation of U.S. patent application Ser. No. 09/828,408, filed Apr. 6, 2001, now U.S. Pat. No. 6,360,807 which is a continuation-in-part of U.S. patent application Ser. No. 09/473,606, filed Dec. 29, 1999, now abandoned the disclosure of is hereby incorporated herein by reference in its entirety.

FIELD OF THE INVENTION

The present invention is directed to processes for forming styrenic copolymers. In particular, the present invention is directed to processes for forming copolymers of styrenic and acrylic monomers. The invention is further directed to processes for forming expandable and expanded styrenic-acrylic copolymers.

BACKGROUND OF THE INVENTION

Styrenic polymers have a wide variety of applications, including the formation of expanded polystyrene which can be used to make a variety of products. Processes for forming styrenic polymers include emulsion polymerization, suspension polymerization, and the use of particular suspensions or emulsion aids.

Polymer particles are useful in applications such as the formation of expanded resins, for example, expanded polystyrene. Expanded polystyrene and other expanded resins can be prepared from expandable polymeric particles made by contacting the polymeric particles with a volatile compound known as a "blowing agent" or "expanding agent". Such agents include aliphatic hydrocarbons such as butane, pentanes, hexanes, and halogenated hydrocarbons such as trichloromethane, trichlorofluoromethane, and methyl chloride. The particles in contact with the expanding agent may be expanded by heating, or by exposure to reduced pressure as in a vacuum. The size and size distribution of the expanded particles will depend upon the size and size distribution of the expandable particles.

Expanded and expandable polymeric resins have applications in packaging, consumer products, and in materials processing. Examples of materials processing applications for expanded polymeric resins include so-called "lost foam casting", also called "evaporative pattern casting". In lost foam casting, molten metal is poured into a pattern made of expanded polymeric material, i.e. a foam, coated with a refractory material surrounded and supported by unbounded sand. The foam is decomposed by the heat of the molten metal and replaced by the metal.

However, parts cast of metals such as iron, using expanded polystyrene foams, may have an unacceptable amount of surface defects and/or folds. The use of foams made of styrenic/acrylic copolymers can improve the quality of foam molds and metal parts made using such molds. Expandable resin compositions made of styrene-acrylic copolymers are described in U.S. Pat. No. 5,403,866.

A need remains for new and/or improved processes for forming styrenic copolymers.

SUMMARY OF THE INVENTION

One aspect of the present invention is a method for forming a styrenic copolymer. The method includes providing polymeric seeds in an aqueous medium; combining with the polymeric seeds, in the aqueous medium, a suspending agent and one or more surfactants in a ratio of about 1:175 or less to the weight of suspending agent, to form a seed mixture; providing a monomer mixture comprising from about 50 to about 90 percent by weight of one or more acrylic monomers, from about 10 to about 50 weight percent of one or more styrenic monomers, and one or more initiators; combining the monomer mixture with one or more expanding agents to form a reaction mixture; combining the seed mixture with about 100 to about 2500 weight percent of the reaction mixture, based on the weight of the seeds in the seed mixture, of the seed mixture to form a polymerization mixture; and heating the polymerization mixture to a polymerization temperature to effect formation of the copolymer.

In preferred embodiments, the total amount of one or more acrylic monomers in the monomer mixture is about 85 weight percent or less. In highly preferred embodiments, the total amount of styrenic and acrylic monomers in the monomer mixture includes from about 50 to about 85 percent by weight of one or more acrylic monomers, and from about 15 to about 50 percent by weight of one or more styrenic monomers.

In certain highly preferred embodiments, the styrenic monomers in the monomer mixture include at least one of styrene or alpha-methyl styrene.

In other highly preferred embodiments, the acrylic monomers in the monomer mixture include at least one of methyl methacrylate, ethyl methacrylate, n-butyl methacrylate, 2-ethyl hexyl methacrylate, n-butyl acrylate, n-hexyl acrylate, and 2-ethyl hexyl acrylate.

In some embodiments, the polymeric seeds comprise, as polymerized units, one or more styrenic monomers.

In some embodiments, the polymeric seeds comprise, as polymerized units, one or more non-styrenic monomers, such as, for example, acrylic monomers.

In some embodiments, the polymeric seeds comprise, as polymerized units, styrenic monomers and non-styrenic monomers.

In certain preferred embodiments, the polymeric seeds comprise, as polymerized units, methyl acrylate.

A further aspect of the invention is a process for preparing a pattern for use in making metal castings. The method includes providing styrenic copolymer particles having diameters from about 150 to about 600 microns; pre-expanding the particles by subjecting the particles to atmospheric steam to obtain a density of about 0.5 to about 2.0 pounds per cubic foot; and molding the particles into the desired pattern having a density of about 2.0 pounds per cubic foot or less.

Another aspect of the present invention is a pattern for use in molding molten metal, formed from a styrenic copolymer by molding into a desired pattern styrenic copolymer particles having diameters from about 150 to about 600 microns, the particles having been pre-expanded by subjecting the particles to atmospheric steam to obtain a density of about 0.5 to about 2.0 pounds per cubic foot. In preferred embodiments, the pattern has a density of about 2.0 pounds per cubic foot or less.

These and other aspects of the invention will become apparent to those skilled in the art in view of the following disclosures and the appended claims.

DETAILED DESCRIPTION OF THE INVENTION

The present invention provides methods for forming styrenic copolymers. Monomers to be polymerized are provided in the form of a reaction mixture. The reaction mixture can be combined with small polymer particles referred to as "seeds".

Seeds for use in the methods described herein may be styrenic or non-styrenic. Also, the seeds may be copolymeric. For example, the seeds may include copolymers of styrenic monomers and acrylic monomers such as methyl methacrylate. The seeds may include acrylic monomers such as methyl methacrylate, and may be, for example, acrylic homopolymers such as polymethylmethacrylate. Moreover, mixtures of two or more types of styrenic and/or non-styrenic seeds may be used.

The use of polymeric seeds in forming the styrenic copolymers can allow the formation of polymeric particles having narrower size distributions than are obtained using some conventional processes. The formation of styrenic polymers by incorporation of polymeric seeds is described in U.S. patent application Ser. No. 09/473,606, the disclosure of which is hereby incorporated herein by reference in its entirety.

Polymeric seeds can be prepared using methods known to those skilled in the art, including conventional emulsion or suspension polymerization methods, such as those disclosed in Odian, Principles of Polymerization, pp. 319–339 and pp. 287–288, John Wiley & Sons, Inc. (1982); or methods disclosed in U.S. Pat. Nos. 4,336,173; 4,459,378; and 2,673,194. The disclosures of each of the patents and publications referred to herein are hereby incorporated herein by reference in their entirety.

The polymer seeds are preferably provided in an aqueous seed suspension, as described hereinbelow. The styrenic monomers in the reaction mixture can be the same as or different from those polymerized in the seeds, and the ratios of monomers in the reaction mixture can be the same as or different from the ratios of polymerized monomers in the seeds. The total amount of styrenic monomers in the reaction mixture when combined with the seeds is preferably at least about 100 weight percent, more preferably at least about 200 weight percent, still more preferably at least about 300 weight percent, and even more preferably at least about 400 weight percent, based on the weight of the seeds. In some embodiments, higher weight percentages of styrenic monomers may be used, such as 1000 weight percent, 2000 weight percent or more.

The reaction mixture contains one or more styrenic monomers, one or more polymerization initiators, and optional additives known for use in suspension polymerization processes. Styrenic monomers that can be polymerized in the reaction mixture according to the processes of the invention include alpha-methyl styrene, paramethyl styrene, para-t-butyl styrene, monochlorostyrene, and dichlorostyrene. Preferred styrenic monomers include styrene and alpha-methyl styrene, and styrene is more preferred.

The amount of styrenic monomers in the reaction mixture prior to combining with the seed suspension is preferably about 50 weight percent or less, more preferably about 45 weight percent or less, even more preferably about 40 weight percent or less, and still more preferably about 35 weight percent or less. In preferred embodiments, the reaction mixture contains about 30 weight percent or less of styrenic monomers, such as about 25, 20, or 15 weight percent.

Initiators suitable for polymerization of styrenic monomers are well known to those skilled in the art. Preferred initiators include benzoyl peroxide, tertiary butyl perbenzoate, and tertiary amyl 2-ethylhexyl peroxycarbonate. The amount of initiator in the reaction mixture is generally at least about 0.05 weight percent, typically at least about 0.1 weight percent, and frequently at least about 0.15 weight percent, based on the total weight of all monomers in the reaction mixture. It is preferred to use as little initiator as can be used to achieve an acceptable polymerization yield. Generally, the amount of initiator in the reaction mixture is about 0.6 weight percent or less, typically about 0.55 weight percent or less, and frequently about 0.5 weight percent or less.

The reaction mixture also contains one or more acrylic monomers copolymerizable with styrenic monomers. "Acrylic monomers", as used herein, means acrylic and methacrylic esters such as, for example, methyl acrylate, ethyl acrylate, butyl acrylate, methyl methacrylate, and ethyl methacrylate. Preferably, the acrylic monomers include methyl methacrylate. The amount of acrylic monomer is preferably at least about 50 weight percent, more preferably at least about 55 weight percent, even more preferably at least about 60 weight percent, and still more at least about 65 weight percent, based on the total weight of all monomers in the reaction mixture. In certain highly preferred embodiments, the reaction mixture can contain about 70 weight percent or more acrylic monomers, such as about 75, 80, or 85 weight percent.

In addition to the seeds, a seed suspension also contains water, a suspending agent, and a surfactant. The order of placing seeds, suspending agent, and surfactant into the water is not critical. Thus, for example, the suspending agent and surfactant can be added to water that contains the seeds, or the seeds can be added to water containing suspending agent and surfactant. Preferred suspending agents are inorganic salts such as phosphates, having minimal to moderate water solubility. Exemplary suitable suspending agents are described in U.S. Pat. No. 2,673,194, already incorporated herein by reference. Preferred suspending agents include tricalcium phosphate, hydroxyapatite, and magnesium phosphate. Tricalcium phosphate ("TCP") is highly preferred. The amount of suspending agent is typically at least about 0.3 weight percent, based on the total weight of the dispersion, more typically at least about 0.4 weight percent, even more typically at least about 0.5 weight percent. The dispersion can also contain optional additives known to those skilled in the art, such as anti-foaming agents. Suitable antifoaming agents are known to those skilled in the art, and are commercially available from manufacturers including Henkel Corporation, Ambler, Pa. (sold under the name Foamaster) and Dow Corning Corporation, Midland, Mich.

Preferred surfactants for use in a seed suspension are anionic surfactants, such as sodium dodecylbenzene sulfonate, sodium lauryl ether sulfonate, sodium lauryl sulfate, and sodium laureth sulfate. Sodium dodecylbenzene sulfonate is highly preferred. The amount of surfactant required is less than that typically used in forming an emulsion, and can be determined by one skilled in the art, without undue experimentation, based upon the composition of the suspending agent. For example, when the suspending agent is tricalcium phosphate, the preferred weight ratio of surfactant to tricalcium phosphate is about 1:175 or less, more preferably about 1:300 or less.

In preferred embodiments, the seed suspension is placed into a reactor and the reaction mixture is added to the seed suspension. Also preferably, the reaction mixture is added to the seed suspension gradually. Gradual addition of the reaction mixture to the seed suspension can be accomplished by pumping, such as, for example, using a metered pump, or by other controlled methods known to those skilled in the art.

Alternatively, aliquots of reaction mixture can be added batchwise to the seed suspension intermittently, such as, for example, every 30 minutes. Each aliquot is preferably added over about 5 to 10 minutes. The amount of reaction mixture in each aliquot will depend, in part, on the quantity of seeds in the reactor. Typically, a weight of reaction mixture equal to about ¼ the weight of seeds in the reactor can be added to the reactor over about a 30-minute period.

The reaction mixture is heated to an appropriate polymerization temperature for the monomer composition and ratio being used, which can be determined by one skilled in the art. If a seed suspension is used, the reaction mixture is preferably heated to an appropriate polymerization temperature for the monomers before being combined with the seed suspension. In addition to the monomer composition, the appropriate polymerization temperature is also dependent, in part, upon the amount and composition of initiators present. For example, if benzoyl peroxide ("BPO") is used as an initiator, the appropriate polymerization temperature for styrenic monomers is generally from about 80° C. to about 95° C. If desired, a second initiator having a higher activation temperature may be used, and the temperature of the reaction mixture may be increased after the polymerization reaction is mostly complete, such as, for example, about 85 percent complete, to a higher temperature referred to as the "finishing temperature". The second initiator may be included in the reaction mixture when the mixture is prepared, or may be added after polymerization of the monomers has started. For styrenic monomers with tertiary amyl 2-ethylhexyl peroxycarbonate (TAEC) initiator, the finishing temperature is preferably from about 114° C. to about 118° C. For styrenic monomers with tertiary butyl perbenzoate initiator, the finishing temperature is preferably from, about 123° C. to about 129° C.

For making expandable copolymers, the reaction mixture and/or the seeds preferably contain one or more blowing agents. The term "blowing agent", as used herein, means a substance capable of inducing expansion or foaming of a polymeric material. Blowing agents can be included in the polymerization mixture when it is expected that the polymer is to be expanded. For example, expanded polystyrene can be formed using polystyrene that has been formed by polymerization of monomers in the presence of a blowing agent. Alternatively, if desired, a blowing agent can be imbibed by the polymer after polymerization is complete.

Preferred blowing agents have boiling points below the softening point of the polymer, and are in the gaseous or liquid state at ordinary room temperatures (about 20–28° C.). Also preferably, the blowing agent is only partially soluble in the polymer. However, in some embodiments, the blowing agent may be capable of being absorbed by the polymer. Suitable blowing agents include hydrocarbons and halogenated hydrocarbons such as, for example, propane, butane, normal pentane, iso-pentane, heptane, hexanes including iso-hexane, propylene, butylene, neopentane, 1-pentene, cyclobutane, cyclopentane, and difluoromethane. Pentanes are preferred, and a mixture of pentanes is highly preferred. Particularly preferred is a mixture of n-pentane, iso-pentane and cyclopentane, and a preferred ratio is 70% n-pentane, 15% iso-pentane, and 15% cyclopentane.

A blowing agent can be added to the reaction mixture at any time. One or more blowing agents can be dissolved in the styrenic monomers prior to combination of the monomers with the seed suspension, and it is believed that dissolution of the blowing agent in the styrenic monomers provides for improved dispersion of the blowing agent in the polymer, as compared to addition of the blowing agent to the reactor after combination of the monomers with the seed suspension. The improved dispersion of the blowing agent in the polymer may result in improved performance of the polymer during use in some applications.

Alternatively, blowing agents can be added to the reactor separately at any time. In some embodiments, a portion of the blowing agent can be dissolved in the styrenic monomers and a portion can be added to the reactor separately. Selection of the preferred manner of adding the blowing agent may be accomplished by one skilled in the art, and will depend in part upon desired properties of the polymer. Generally, the earlier in the process of the reaction the blowing agent is added, the slower the reaction will proceed and the lower will be the molecular weight of the polymer. However, the inventors have discovered that one or more blowing agents can be added to the seed suspension and the suspension containing the blowing agent maintained at a temperature of about 80° C. to about 105° C. for several hours, e.g., 2, 3, or 4 hours. Preferably the seed suspension is then allowed to reach the desired reaction temperature, including cooling or heating as necessary, before the reaction mixture is combined with the seed mixture. While it is not intended that the invention be bound by any particular theory, it is believed that maintaining the seed suspension and blowing agent at an elevated temperature for several hours allows the blowing agent to impregnate the seeds and provides an increased reaction rate. Polymeric seeds impregnated by a blowing agent can be referred to as "expandable" polymeric seeds. Expandable polymeric seeds can be used in the processes disclosed herein, in place of conventional polymeric seeds.

For applications requiring an expanded polymer, styrenic copolymers having a blowing agent dispersed therein can be stored until needed, and expanded by heating to a temperature above the boiling point of the blowing agent and above the glass transition temperature (Tg) of the polymer containing the blowing agent.

For some applications, styrenic copolymers formed according to the methods herein may be partially expanded to form "prepuff". "Prepuff", as used herein means polymeric particles or beads having expanding agents incorporated therein and having been partially expanded but capable of being further expanded. Prepuff may be aged, then heated using, for example, steam, to form a molded article. Exemplary methods for forming molded articles using styrenic copolymers and suitable for use with styrenic copolymers prepared using the methods described herein, are described in Ingram et al., "Polystyrene and Related Thermoplastic Foams", *Plastic Foams,* Part II, Chapter 10, pp. 531–581, (Marcel Dekker, 1973); and Ingram et al., "Expandable Polystyrene Processes", *Addition and Condensation Polymerization Processes,* Chapter 33, pp. 531–535 (American Chemical Society 1969), the disclosures of each of which are hereby incorporated herein by reference in their entirety.

In some embodiments, a pre-swelling mixture can be used, as described in U.S. patent application Ser. No. 09/473,606, already incorporated herein by reference.

The term "swelling" as used herein, including as used with respect to "preswelling", is not intended to imply any mechanism, but refers only to an increase in size of the polymeric seeds and/or growth in size of a polymeric particle.

In embodiments of the invention wherein a seed suspension is used, the rate of combination of the reaction mixture with the seed suspension can be controlled, for example, by using a pump. As mentioned, preferably the reaction mixture is added to the seed suspension, the seed suspension having been placed into a reaction vessel. When a pre-swelling mixture is used, the pre-swelling mixture is placed into the reaction vessel, containing the seed suspension, and the reaction mixture is then added. The rate of pumping the reaction mixture into the reactor can be varied intermittently. Such variation can include temporarily halting pumping or decreasing the rate. A regular pattern of variation can be referred to as a "profile", for example, a pump profile. A pump profile would result if a graphic representation were made of pumping rate as a function of time. For example, a suitable pump profile may resemble stairs, and may be referred to as a "step" profile. Other suitable pump profiles include linear profiles and "second order profiles", wherein a graphic representation of pump rate as a function of time would approximate a plot of a second-order mathematical function; regular batch additions of reaction mixture; and power law function profiles. In some embodiments, an external control such as a computer program may be used to control the pump rate, and the program may include parameters such as the amount of monomer theoretically present in the reactor at a given time. A feedback apparatus, such as a flow meter, may be used to help in controlling the rate of pumping the mixtures into the reactor. Generally, it is preferred that the amount of monomer in the reactor be about 30 weight percent or less, based on the total weight of the monomer plus polymer, including original polymeric seed plus any polymer formed during reaction, in the reactor, substantially throughout the reaction until all of the monomer has been added to the reactor. More preferably, the amount of monomer is about 20 weight percent or less.

Additives that may be present in the reaction mixture include waxes. The use of waxes in polymerization processes is known to those skilled in the art. Suitable waxes for use in the processes of the invention include microcrystalline waxes and Fisher-Tropsch waxes having appropriate melting points. It has been discovered that some waxes, when added in particulate form, may form regions of wax that are larger in volume than the initial size of individual wax particles. The formation of large regions of wax may be undesirable for some applications. While it is not intended that the invention be bound by any particular theory, it is believed that waxes may provide nucleation sites for the formation of cells when the polymer includes a blowing agent and is later expanded.

In some embodiments, styrenic copolymers formed according to the invention comprise polymeric particles having a core and a shell. The core of such a polymeric particle comprises a polymeric seed. The shell comprises, as polymerized units, from about 50 to about 85 weight percent one or more acrylic monomers, and from about 15 to about 50 weight percent of one or more styrenic monomers.

A general procedure for forming styrenic copolymers according to the processes disclosed herein, including a polymerization cycle and a finishing cycle, follows. A suspension containing deionized water, polymer seeds, a suspending agent, a surfactant, and an antifoaming agent is placed within an appropriately-sized reactor, and heated to an elevated temperature sufficient to effect the beginning of polymerization. Generally, the volume of the monomer emulsion tank reactor is at least about 1.5 times, preferably at least about 2 times, the total final volume of all reaction components. Preferably the suspension is heated to about 35° C., more preferably about 40° C. A reaction mixture including one or more styrenic monomers, one or more acrylic monomers, one or more initiators and optionally one or more blowing agents, is added.

A separate initiator mixture may be used and, if used, preferably includes one or more initiators dissolved in a styrenic monomer. A particularly preferred initiator mixture includes styrene containing a peroxide initiator dissolved therein, such as benzoyl peroxide. The separate initiator mixture is added to the suspension gradually, preferably using a pump, over about 5–20 minutes, preferably about 10–15 minutes. The combined mixture, which includes the reaction mixture and optional initiator mixture, and suspension are held at the elevated temperature for at least about 45 minutes, preferably at least about 50 minutes, more preferably at least about 60 minutes, even more preferably at least about 70 minutes and still more preferably at least about 80 minutes. If desired, one or more samples of the combined mixture and suspension may be removed, preferably after about 1 hour of heating, for analysis such as molecular weight determination, residual monomer content analysis, or microscopy.

A reaction mixture including one or more styrenic monomers, one or more acrylic monomers, one or more initiators and optionally one or more blowing agents, is added to the seed suspension, to form a polymerization mixture. The reaction mixture is preferably added gradually, e.g., using a pump. Preferably, the reaction mixture is initially added at a rate of about 0.5 lbs./min or more, more preferably about 0.6 lbs./min or more, even more preferably about 0.66 lbs./min or more. Preferably, for about one hour, the rate of addition of the reaction mixture to the seed suspension is less than about 1 lbs./min. If the reaction mixture is added too rapidly during about the first hour, the forming polymer may coagulate. After about one hour, the rate may be increased to about 1 lbs./min or more, preferably about 1.20 lbs./min or more, and more preferably about 1.22 lbs./min.

A finishing mixture is preferably then added. The finishing mixture includes deionized water, a suspending agent, and one or more surfactants. After the finishing mixture has been added, the reaction vessel containing the combined polymerization mixture and finishing mixture is sealed and purged with an inert gas, preferably nitrogen. Preferably, the inert gas is added to pressurize the vessel to 5 psig nitrogen. The combined mixtures are agitated for about 30 minutes. The agitation rate is not critical, and one skilled in the art can determine an appropriate agitation rate to ensure adequate mixing. Any remaining reaction mixture not yet added to the reaction vessel is then added gradually but preferably at an increased rate, such as about 1.5 lbs./min or more.

If desired, a reaction mixture excluding the blowing agents may be added to the seed suspension to form a polymerization mixture, which is then polymerized to form polymer beads. The beads can then be isolated and optionally screened to remove undersized, oversized, and/or clustered beads. The screened beads can then be re-suspended in water and impregnated with one or more blowing agents. Such a procedure may be referred to as a "two-step" process, to refer to the addition of an additional step of removing and screening the polymer beads before proceeding with addition of a blowing agent.

After the addition of the reaction mixture to the vessel is completed, the vessel contents are heated relatively quickly, preferably at a rate of about 0.5° C./min or more, more preferably about 1° C./min or more, and preferably not higher than about 3° C./min, to a temperature of about 113–116° C. While the vessel is being heated, the pressure of the vessel is monitored. The pressure preferably does not increase above about 125 psig. If the pressure rises to about 135 psig, the temperature should be reduced by about 6–10°

C., e.g., to about 108° C. The vessel is maintained at the increased temperature for about 7 hours. The vessel is then cooled to about 38° C. or less, and the contents are transferred to a vessel such as a batch-out tank. Because a substantial amount of foaming may have occurred, it is preferred that as little foam as possible be transferred with the vessel contents.

The transferred contents are acidified to a pH of about 2.0 or less. A product is then recovered from the acidified vessel contents by drying. Drying may be accomplished using a conventional drying instrument known for use in drying polymeric materials. The product will be in the form of particles. If desired, the particles can be screened. The particles may then be stored, or may be used to form a molded part. Storage conditions are not critical, and the particles may be stored at room temperature in a closed container. Molded parts made from the compositions disclosed herein may be used to form patterns for use in lost foam processes using molten metals such as iron.

Lost foam molding processes are described, for example, in *Expandable Patteni Casting*, Vol. 1 (American Foundrymen's Society, 1994), and in U.S. Pat. Nos. 4,028,285; 4,113,672; 3,755,209; 3,975,327; 4,281,067; and 4,286,071, the disclosures of each of which are hereby incorporated herein by reference in their entirety.

For use in lost foam molding processes, styrenic copolymers prepared according to the methods described herein and in the form of particles having diameters of at least about 100 microns are preferred. Also, it is generally preferred to use polymeric particles having diameters of about 600 microns or less in lost foam molding processes. Preferably, the copolymeric particles have molecular weights of at least-about 150,000, and more preferably at least about 170,000. Also preferably, the copolymeric particles have molecular weights of about 350,000 or less, more preferably about 320,000 or less, and even more preferably about 300,000 or less.

EXAMPLES

The following examples are merely illustrative of the present invention and should not be considered as limiting the scope of the invention in any way.

All benzoyl peroxide initiator used in these examples is 75% active.

Example 1
(33.6% MMA Content)
Preparation of Expandable Styrene/methyl Methacrylate (SMMA) Copolymer Particles An initiator mixture was prepared by combining 12 lbs. styrene and 14.2 g. benzoyl peroxide.

To a monomer emulsion tank reactor the following were added: 146.2 pounds (lbs.) styrene, 146.2 lbs. methyl methacrylate, 198.95 grams (g) benzoyl peroxide (BPO; 1500 ppm based on the amount of styrene), 582.78 g tertiary amyl 2-ethylhexyl peroxycarbonate (TAEC; 4400 ppm based on the amount of styrene). The methyl methacrylate/styrene ratio (MMA/Sty) ratio in this reaction mixture was 50/50. However, taking into consideration the styrene used in the initiator solution the final ratio was calculated to be 48/52.

A swelling suspension was made using the following components:
  1816 g. tricalcium phosphate (TCP)
  10.4 g. Nacconol brand anionic surfactant (available from Stepan Company)
  12 g Foamaster anti-foaming agent (available from Henkel Corporation)
  435 lbs. deionized water
  130.5 lbs. polystyrene seeds having average diameters of 235 microns The swelling suspension was made by adding water, seeds having diameters of 235 microns, and TCP into a flask. Then with constant agitation was added the anti-foaming agent followed by the surfactant.

A finishing suspension was made by mixing the following:
  5 lbs. deionized water
  454 g. TCP
  2.6 g. Nacconol anionic surfactant (available from Stepan Company)
  97 g. Triton X-102 (nonionic octylphenol polyether alcohols; from Union Carbide).
  57 g. Triton X-305 surfactant The swelling suspension was placed into a 100-gallon reactor, and heated to 40° C. Once the temperature reached 40° C., the initiator mixture was added to the reactor gradually over 10 minutes using a Milton Roy pump. After all of the initiator mixture had been added to the reactor, the temperature was held at 40° C. for an additional 50 minutes. The temperature was then raised to 85° C. A sample was removed from the reactor for molecular weight and residual analysis, then the temperature was held for an additional 30 minutes.

The reaction mixture from the emulsion tank reactor was then added to the reactor gradually using a pump, according to the following schedule:
  0.66 lbs./min for one hour
  1.21 lbs./mm for one hour
  1.21 lbs./min for one hour
  1.60 lbs./min for one hour
until the reactor contained 87.9 lbs., then the pump was turned off.

After each hour, a sample was taken for molecular weight and residual analysis, and photographed using a Nikon microscope, equipped with a SMZ-U Optical body with 10:1 zoom ratio and 0.75–7.5×zoom range; an ED plan 2.0× objective, working distance 40 mm, and using simultaneous CCTV and photographic imaging.

To the monomer emulsion tank reactor was added 18.6 lbs. mixed pentanes (70 weight % n-pentane, 15 weight % iso-pentane, and 15 weight % cyclopentane), and 18.6 lbs. iso-hexane. While this mixture was being stirred for 30 minutes, the finishing suspension was then added to the reactor. The reactor was sealed and purged with 5 psig nitrogen and repressurized to 5 psig nitrogen. After the 30 minute hold time, the pump was restarted and the reaction mixture pumped into the reactor at about 1.60 lbs./min. Pumping was continued until the monomer emulsion tank reactor was empty.

Finishing Cycle

When all of the reaction mixture had been added, the reactor was heated to 115° C. at a rate of about 0.5° C. per minute, and held for seven hours. During the seven hour period, the pressure was monitored. After seven hours, the reactor was cooled to 35° C. The reaction mixture was transferred to a batch out tank without washing residual material, particularly foam, into the tank.

The reaction mixture containing the expandable styrene/methylmethacrylate copolymer was acidified to a pH of 1.6–2.0, then dried using a Carter Day dryer. The material was screened using 36 mesh TBC on the top and 90 mesh TBC on the bottom to remove clusters and fines. The prime cut collected was expandable styrene/methylmethacrylate copolymer particles.

Example 2
Airing and Blending of Styrene/methylmethacrylate Copolymer Particles The dried, cooled copolymer particles from Example 1 were aired at 24° C. for 1.5 hours. About 50 pounds of copolymer particles were blended with silicone oil (about 100 g of silicone oil per 1000 lbs. of particles), and zinc stearate (about 4000 g zinc stearate per 1000 lbs. of particles). Blending was continued for about 3 minutes for each.

Example 3
Expansion and Molding

The blended particles from example 2 were expanded at 60–260 second expansion times using a Kurtz KV 450 pre-expander to form pre-puff beads. The pre-puff beads had densities ranging from about 1.4–3.0 pounds per cubic foot (pcf) depending on the time in the preexpander which was heated to about 106° C. Pre-puff beads expanded for 200 seconds had a density of about 1.48±0.05 pcf. The pre-puff were aged for about 12 hours, then molded in a Kurtz Model 684 mold press.

Example 4
(60.6% MMA Content)
Preparation of Expandable Styrene/methyl Methacrylate (SMMA) Copolymer Particles An initiator mixture was prepared by combining 12 lbs. styrene and 14.2 g. benzoyl peroxide.

To a monomer emulsion tank reactor the following were added: 29 pounds (lbs.) styrene, 264 lbs. methyl methacrylate, 198.95 grams (g) benzoyl peroxide (BPO; 1500 ppm based on the amount of styrene), 582.78 g tertiary amyl 2-ethylhexyl peroxycarbonate (TAEC; 4400 ppm based on the amount of styrene). The methyl methacrylate/styrene ratio (MMA/Sty) ratio in this reaction mixture was 90.1/9.9. However, taking into consideration the styrene used in the initiator solution the ratio drops to 86.5/13.5.

A swelling suspension was made by mixing the following:
  435 lbs. deionized water
  130.5 lbs. polystyrene seeds having average diameters of 235 microns
  1816 g. tricalcium phosphate (TCP)
  10.4 g. Nacconol brand anionic surfactant (available from Stepan Company)
  12 g Foamaster anti-foaming agent (available from Henkel Corporation)

The swelling suspension was made by adding water, seeds, and TCP into a flask. Then with constant agitation was added the anti-foaming agent followed by the surfactant.

A finishing suspension was made by mixing the following:
  5 lbs. deionized water
  454 g. TCP
  2.6 g. Nacconol anionic surfactant (available from Stepan Company)
  97 g. Triton X-102 surfactant (nonionic octylphenol polyether alcohols; from Union Carbide).
  57 g. Triton X-305 surfactant The swelling suspension was placed into a 100-gallon reactor, and heated to 40° C. Once the temperature reached 40° C., the initiator mixture was added to the reactor gradually over 10 minutes using a Milton Roy pump. After all of the initiator mixture had been added to the reactor, the temperature was held at 40° C. for an additional 50 minutes. The temperature was then raised to 85° C. A sample was removed from the reactor for molecular weight and residual analysis, then the temperature was held for an additional 30 minutes.

The reaction mixture from the emulsion tank reactor was then added to the reactor gradually using a pump, according to the following schedule:
  0.65 lbs./min for one hour
  0.85 lbs./min for one hour
  1.10 lbs./min for one hour
  1.43 lbs./min for one hour
  1.43 lbs./min for one hour
until the reactor contained 87.9 lbs., then the pump was turned off.

After each hour, a sample was taken for molecular weight and residual analysis, and photographed using a Nikon microscope, equipped with a SMZ-U Optical body with 10:1 zoom ratio and 0.75–7.5×zoom range; an ED plan 2.0× objective, working distance 40 mm, and using simultaneous CCTV and photographic imaging.

To the monomer emulsion tank reactor was added 37.2 lbs. mixed pentanes (70 weight % n-pentane, 15 weight % iso-pentane, and 15 weight % cyclopentane). While this mixture was being stirred for 30 minutes, the finishing suspension was then added to the reactor. The reactor was sealed and purged with 5 psig nitrogen and repressurized to 5 psig nitrogen. After the 30 minute hold time, the pump was restarted and the reaction mixture pumped into the reactor at about 1.60 lbs./min. Pumping was continued until the monomer emulsion tank reactor was empty.

Finishing Cycle

When all of the reaction mixture had been added, the reactor was heated to 115° C. at a rate of about 0.5° C. per minute, and held for seven hours. During the seven hour period, the pressure was monitored. After seven hours, the reactor was cooled to 35° C. The reaction mixture was transferred to a batch out tank without washing residual material, particularly foam, into the tank.

The reaction mixture containing the expandable styrene/methylmethacrylate copolymer was acidified to a pH of 1.6–2.0, then dried using a Carter Day dryer. The material was screened using 36 mesh TBC on the top and 90 mesh TBC on the bottom to remove clusters and fines. The prime cut collected was expandable styrene/methylmethacrylate copolymer particles.

Example 5
Airing and Blending of Styrene/methylmethacrylate Copolymer Particles The dried, cooled copolymer particles from Example 4 were aired at 24° C. for 1.5 hours. About 50 pounds of copolymer particles were blended with silicone oil (about 100 g of silicone oil per 1000 lbs. of particles), and zinc stearate (about 4000 g zinc stearate per 1000 lbs. of particles). Blending was continued for about 3 minutes for each.

Example 6
Expansion and Molding

The blended particles from example 5 were expanded at 60–260 second expansion times using a Kurtz KV 450 pre-expander to form pre-puff beads. The pre-puff beads had densities ranging from about 1.5–3.6 pounds per cubic foot (pcf) depending on the time in the preexpander which was heated to about 112° C. Pre-puff beads expanded for 200 seconds had a density of about 1.80±0.05 pcf. The pre-puff were aged for about 12 hours, then molded in a Kurtz Model 684 mold press.

Example 7
(53.9% MMA Content)
Preparation of Expandable Styrene/methyl Methacrylate (SMMA) Copolymer Particles An initiator mixture was prepared by combining 12 lbs. styrene and 14.2 g. benzoyl peroxide.

To a monomer emulsion tank reactor the following were added: 58 pounds (lbs.) styrene, 234 lbs. methyl methacrylate, 198.95 grams (g) benzoyl peroxide (BPO; 1500 ppm based on the amount of styrene), 582.78 g tertiary amyl 2-ethylhexyl peroxycarbonate (TAEC; 4400 ppm based on the amount of styrene). The methyl methacrylate/ styrene ratio (MMA/Sty) ratio in this reaction mixture was 80.1/19.9. However, taking into consideration the styrene used in the initiator solution the ratio drops to 77/23.

A swelling suspension was made by mixing the following:
 435 lbs. deionized water
 130.5 lbs. polystyrene seeds having average diameters of 235 microns
 1816 g. tricalcium phosphate (TCP)
 10.4 g. Nacconol brand anionic surfactant (available from Stepan Company)
 12 g Foamaster anti-foaming agent (available from Henkel Corporation)

The swelling suspension was made by adding water, seeds, and TCP into a flask. Then with constant agitation was added the anti-foaming agent followed by the surfactant.

A finishing suspension was made by mixing the following:
 5 lbs. deionized water
 454 g. TCP
 2.6 g. Nacconol anionic surfactant (available from Stepan Company)
 97 g. Triton X-102 surfactant (nonionic octylphenol polyether alcohols; from Union Carbide).
 57 g. Triton X-305 surfactant The swelling suspension was placed into a 100-gallon reactor, and heated to 40° C. Once the temperature reached 40° C., the initiator mixture was added to the reactor gradually over 10 minutes using a Milton Roy pump. After all of the initiator mixture had been added to the reactor, the temperature was held at 40° C. for an additional 50 minutes. The temperature was then raised to 85° C. A sample was removed from the reactor for molecular weight and residual analysis, then the temperature was held for an additional 30 minutes.

The reaction mixture from the emulsion tank reactor was then added to the reactor gradually using a pump, according to the following schedule:
 0.65 lbs./min for one hour
 0.85 lbs./min for one hour
 1.10 lbs./min for one hour
 1.43 lbs./min for one hour
 1.43 lbs./min for one hour
until the reactor contained 87.9 lbs., then the pump was turned off.

After each hour, a sample was taken for molecular weight and residual analysis, and photographed using a Nikon microscope, equipped with a SMZ-U Optical body with 10:1 zoom ratio and 0.75–7.5×zoom range; an ED plan 2.0× objective, working distance 40 mm, and using simultaneous CCTV and photographic imaging.

To the monomer emulsion tank reactor was added 37.2 lbs. mixed pentanes (70 weight % n-pentane, 15 weight % iso-pentane, and 15 weight % cyclopentane). While this mixture was being stirred for 30 minutes, the finishing suspension was then added to the reactor. The reactor was sealed and purged with 5 psig nitrogen and repressurized to 5 psig nitrogen. After the 30 minute hold time, the pump was restarted and the reaction mixture pumped into the reactor at about 1.60 lbs./min. It was continued until the monomer emulsion tank reactor was empty.

Finishing Cycle

When all of the reaction mixture had been added, the reactor was heated to 115° C. at a rate of about 0.5° C. per minute, and held for seven hours. During the seven hour period, the pressure was monitored. After seven hours, the reactor was cooled to 35° C. The reaction mixture was transferred to a batch out tank without washing residual material, particularly foam, into the tank.

The reaction mixture containing the expandable styrene/ methylmethacrylate copolymer was acidified to a pH of 1.6–2.0, then dried using a Carter Day dryer. The material was screened using 36 mesh TBC on the top and 90 mesh TBC on the bottom to remove clusters and fines. The prime cut collected was expandable styrene/methylmethacrylate copolymer particles.

Example 8
Airing and Blending of Styrene/methylmethacrylate Copolymer Particles

The dried, cooled copolymer particles from Example 4 were aired at 24° C. for 1.5 hours. About 50 pounds of copolymer particles were blended with silicone oil (about 100 g of silicone oil per 1000 lbs. of particles), and zinc stearate (about 4000 g zinc stearate per 1000 lbs. of particles). Blending was continued for about 3 minutes for each.

Example 9
Expansion and Molding

The blended particles from example 5 were expanded at 60–260 second expansion times using a Kurtz KV 450 pre-expander to form pre-puff beads. The pre-puff beads had densities ranging from about 1.1–2.8 pounds per cubic foot (pcf) depending on the time in the preexpander which was heated to about 112° C. Pre-puff beads expanded for 200 seconds had a density of about 1.60±0.05 pcf. The pre-puff were aged for about 12 hours, then molded in a Kurtz Model 684 mold press.

Example 10
(66.1% MMA Content)
Preparation of Styrene/methyl Methacrylate (SMMA) Copolymer Particles An initiator mixture was prepared by combining 12 lbs. styrene and 14.2 g. benzoyl peroxide.

To a monomer emulsion tank reactor the following were added: 46 pounds (lbs.) styrene, 234 lbs. methyl methacrylate, 198.95 grams (g) benzoyl peroxide (BPO; 1500 ppm based on the amount of styrene), 582.78 g tertiary amyl 2-ethylhexyl peroxycarbonate (TAEC; 4400 ppm based on the amount of styrene). The methyl methacrylate/ styrene ratio (MMA/Sty) ratio in this reaction mixture was 80.1/19.9. However, taking into consideration the styrene used in the initiator solution the ratio drops to 77/23.

A swelling suspension was made by mixing the following:

435 lbs. deionized water 50.0 lbs. polystyrene seeds having average diameters of 235 microns 1816 g. tricalcium phosphate (TCP)

10.4 g. Nacconol brand anionic surfactant (available from Stepan Company)

12 g Foamaster anti-foaming agent (available from Henkel Corporation)

The swelling suspension was made by adding water, seeds, and TCP into a flask. Then with constant agitation was added the anti-foaming agent followed by the surfactant.

A finishing suspension was made by mixing the following:

5 lbs. deionized water 454 g. TCP 2.6 g. Nacconol anionic surfactant (available from Stepan Company)

97 g. Triton X-102 surfactant (nonionic octylphenol polyether alcohols; from Union Carbide).

57 g. Triton X-305 surfactant

The swelling suspension was placed into a 100-gallon reactor, and heated to 40° C. Once the temperature reached 40° C., the initiator mixture was added to the reactor gradually over 10 minutes using a Milton Roy pump. After all of the initiator mixture had been added to the reactor, the temperature was held at 40° C. for an additional 50 minutes. The temperature was then raised to 85° C. A sample was removed from the reactor for molecular weight and residual analysis, then the temperature was held for an additional 30 minutes.

The reaction mixture from the emulsion tank reactor was then added to the reactor gradually using a pump, according to the following schedule:

0.22 lbs./min for one hour 0.29 lbs./min for one hour 0.37 lbs./min for one hour 0.48 lbs./min for one hour 0.63 lbs./min for one hour 0.82 lbs./min for one hour 1.07 lbs./min for one hour 1.39 lbs./min for one hour 1.79 lbs./min for one hour until the reactor contained 87.9 lbs., then the pump was turned off.

After each hour, a sample was taken for molecular weight and residual analysis, and photographed using a Nikon microscope, equipped with a SMZ-U Optical body with 10:1 zoom ratio and 0.75–7.5×zoom range; an ED plan 2.0× objective, working distance 40 mm, and using simultaneous CCTV and photographic imaging.

While this mixture was being stirred in the monomer emulsion tank reactor for 30 minutes, the finishing suspension was then added to the reactor. The reactor was sealed and purged with 5 psig nitrogen and repressurized to 5 psig nitrogen. After the 30 minute hold time, the pump was restarted and the reaction mixture pumped into the reactor at about 1.60 lbs./min. It was continued until the monomer emulsion tank reactor was empty.

Finishing Cycle

When all of the reaction mixture had been added, the reactor was heated to 115° C. at a rate of about 0.5° C. per minute, and held for seven hours. During the seven hour period, the pressure was monitored. After seven hours, the reactor was cooled to 35° C. The reaction mixture was transferred to a batch out tank without washing residual material, particularly foam, into the tank.

The reaction mixture containing a styrene/methylmethacrylate copolymer was acidified to a pH of 1.6–2.0, then dried using a Carter Day dryer, providing styrene/methylmethacrylate copolymer particles.

Example 11

Impregnation of Styrene/methylmethacrylate Copolymer Particles

To a stirred 50 gallon reactor was added 235 lbs. deionized water 230 lbs. of styrene/methylmethacrylate copolymer particles from Example 10

474 g. tricalcium phosphate (TCP)

29 g. Nacconol anionic surfactant (available from Stepan Company)

160 g. Triton X-102 surfactant 320 g. Triton X-305 surfactant

The reactor was purged 3 times with nitrogen. Then a bomb containing 23 lbs. of isohexane was added at 52° C. such that the rate was 1.5 lbs. every 5 minutes. The temperature was raised 4° C. every 5 minutes. When the temperature reached 88° C., it was there for 1 hour. Afterwards the reactor was heated from 88° C. to 105° C. at 8° C./5 minutes and kept at 108° C. for 3 hours.

The reactor was cooled to 35° C. The reaction mixture was transferred to a batch out tank. The reaction mixture containing the expandable styrene/methylmethacrylate copolymer was acidified to a pH of 1.6–2.0, then dried using a Carter Day dryer. The material was screened using 36 mesh TBC on the top and 90 mesh TBC on the bottom to remove clusters and fines. The prime cut collected was expandable styrene/methylmethacrylate copolymer particles.

Example 12

Evaluation of Physical Properties of Expanded Copolymers

Polymer particle size was determined by laser light attenuation using a Coulter LS 2000 PSA particle size analyzer, which is capable of measuring particle sizes ranging from about 1 to about 2000 micrometers. Residual monomer content was determined using gas chromatography.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A method for forming an expandable styrenic copolymer, comprising:

providing polymeric seeds in an aqueous medium;

combining with the polymeric seeds, in the aqueous medium, a suspending agent and one or more surfactants in a ratio of about 1:175 or less to the weight of suspending agent, to form a seed mixture;

providing a monomer mixture comprising from about 50 to about 90 percent by weight of one or more acrylic monomers, from about 10 to about 50 weight percent of one or more styrenic monomers, and one or more initiators;

combining the monomer mixture with one or more expanding agents to form a reaction mixture;

combining the seed mixture with about 100 to about 2500 weight percent of the reaction mixture, based on the weight of the seeds in the seed mixture, of the seed mixture to form a polymerization mixture;

and heating the polymerization mixture to a polymerization temperature to effect formation of the copolymer.

2. The method of claim 1, wherein said styrenic monomer is selected from the group consisting of styrene and alpha-methyl styrene.

3. The method of claim 1, wherein said acrylic monomer is selected from the group consisting of ethyl methacrylate, n-butyl methacrylate, 2-ethyl hexyl methacrylate, methyl acrylate, ethyl acrylate, n-butyl acrylate, n-hexyl acrylate, and 2-ethyl hexyl acrylate.

4. The method of claim 1, wherein the total amount of one or more acrylic monomers is about 85 weight percent or less.

5. The method of claim 1, wherein the polymeric seeds comprise, as polymerized units, one or more styrenic monomers.

6. The method of claim 1, wherein the polymeric seeds comprise, as polymerized units, one or more non-styrenic monomers.

7. The method of claim 1, wherein the polymeric seeds comprise one or more styrenic monomers and one or more non-styrenic monomers.

8. The method of claim 6, wherein said non-styrenic monomers comprise acrylic monomers.

9. A styrenic copolymer formed according to the method of claim 1.

10. A styrenic copolymer formed according to the method of claim 1, comprising copolymer particles having diameters from about 150 to about 600 microns.

11. A process for preparing a pattern for use in making metal castings comprising:

(a) providing styrenic copolymer particles made according to the method of claim 1 and having diameters from about 150 to about 600 microns;

(b) pre-expanding the particles by subjecting the particles to atmospheric steam to obtain a density of about 0.5 to about 2.0 pounds per cubic foot; and (c) molding the particles into the desired pattern having a density of about 2.0 pounds per cubic foot or less.

12. A pattern for use in molding molten metal, comprising a pattern formed from a styrenic polymer formed according to the method of claim 1.

* * * * *